United States Patent Office 3,112,235
Patented Nov. 26, 1963

3,112,235
METHOD OF ADHERING SURFACES
Samuel E. Blanchard, Sidney, N.Y., assignor to The Borden Company, New York, N.Y., a corporation of New Jersey
No Drawing. Filed Dec. 31, 1959, Ser. No. 863,082
5 Claims. (Cl. 156—310)

This invention relates to the process of producing an adhesive bond between surfaces and particularly to the acceleration of the development of wet strength in an adhesive including polyvinyl alcohol.

The invention is particularly useful in bonding paper surfaces and will be illustrated by description in connection with such use.

In bonding such surfaces, as in making corrugated paper boxes, the adhesive is applied between the surfaces to be bonded and the composited article is retained on the box making machine long enough to give such wet strength in the bond that the surfaces will not separate (not "let go") before the full dry strength of the bond is developed. As a result of much effort to obtain greater and greater speeds on these box machines, some of them will now deliver 30,000 or more boxes per hour.

The present invention provides accelerated development of wet strength of the bond in a polyvinyl alcohol adhesive so that the time required to develop adequate wet strength is decreased by at least a third in representative runs.

Briefly stated the invention comprises the herein described process of bonding two objects, one of which is porous, by steps including applying to the surface of one of the objects a polyvinyl alcohol containing adhesive and to the other of the surfaces a soluble boron compound that in contact with the said adhesive causes gelation, continuing the momentary contact of the applied materials with the surfaces until one of the materials applied to the porous object has penetrated a very slight but effective distance below the surface of the object, bringing the two surfaces with the treating materials thereon into contact with each other, maintaining the contact until gelation of the polyvinyl alcohol solution occurs, and then allowing the glued assembly to dry.

The gelation will be partly between the two surfaces and partly below the surface of the porous one or ones of the said objects so that the gelation provides adequate footing or anchorage of the bond and also a gelled film between the surfaces.

The boron compound used must be one that is appreciably soluble in water and effective in causing gelation of aqueous solutions of polyvinyl alcohol. Ordinarily I use an alkali metal borate of which sodium metaborate is an example. Once its action with the polyvinyl alcohol is observed a theory may be advanced to explain the action. The borate, in contact with water in the polyvinyl alcohol adhesive composition promotes cross linking which is a cause of gelation.

In place of metaborate I can use other alkali metal borates having varying ratios of sodium, potassium, or lithium oxides to boron trioxide, as for example 1–12 moles of the alkali metal oxide for each 6 moles of $B_2O_3$. This corresponds to 1–12 equivalents of the metal for 6 atoms of boron. I may also use boric acid alone although this is not recommended because of the low solubility of boric acid in water at ordinary temperatures and lesser effectiveness in causing the gelation. Combinations of the metal oxide and boron trioxide that may be used are those represented in the varying ratios described above and the corresponding potassium, lithium, and ammonium salts. I have not found any other borates, even if soluble in water, that afford advantages over the economical borates of the metals that have been named.

The polyvinyl alcohol used may be substantially pure but is satisfactory in the commercial form representing the product of incomplete hydrolysis of polyvinyl acetate to polyvinyl alcohol, as for instance those in which 80 to 100 percent of the original acetate groups have been hydrolyzed to the polyvinyl alcohol. These proportions are ordinarily designated commercially as percentage hydrolysis.

Of the objects to be adhered by my process, one at least is porous, i.e., penetrable by aqueous solutions and by water vapor escaping during drying. Particularly suitable are sheets of paper, cardboard, chipboard, wood, textile fabrics, and the like. Such porous sheet material may be laminated with other materials of the kind stated, with aluminum, copper, bronze, or other metal foil, or with cellophane, polyethylene, polymethylmethacrylate and like plastic materials.

The polyvinyl alcohol and associated polyvinyl acetate, when used, are applied in dispersion, i.e., in true or colloidal solution or as a fine emulsion. Water is especially satisfactory as the dispersing medium or solvent because it dissolves the borate quickly and establishes quick and intimate contact between the borate or hydrolysis products thereof and the polyvinyl alcohol originally in the water solution.

Other materials that are conventional in polyvinyl alcohol adhesives may be present in the solution of the polyvinyl alcohol. These other materials include surfactants such as Myrj 45 (polyoxyethylene stearate), Tween 60 (polyoxyethylene sorbitan monostearate), and glycerine monooleate, monopalmitate, or monostearate; polyvinyl acetate, methyl or ethyl acrylate or methacrylate or other acrylic emulsions; latices of natural or synthetic rubbers; extenders such as starch, alkoxylated polyvinyl alcohol having therein about 10–100 parts by weight of ethylene oxide for 100 of the alcohol, karaya, other natural gums, and methyl cellulose; fillers such as fine clay, powdered Douglas fir bark, and precipitated calcium carbonate; phenol or other preservative; and water to reduce the viscosity of the adhesive solution to that desired.

Proportions in which the materials in the polyvinyl alcohol (PVOH) dispersion can be used are as follows:

TABLE 1

| Component of PVOH Dispersion | Percent by Weight | |
| --- | --- | --- |
| | Permissible | Recommended Commercially |
| Polyvinyl alcohol | 0.2–30 | 1–10 |
| Total polyvinyl compounds (alcohol plus acetate) | 0.2–60 | 1–55 |
| Extender, e.g., starch | 0–25 | 5–15 |
| Surface active agent | 0.1–5 | 0.1–1 |
| Alkoxylated polyvinyl alcohol | 0–20 | 2–10 |
| Preservative, e.g., phenol | 0–1 | 0.1–0.5 |
| Filler, e.g., clay | 0–70 | 10–40 |
| Water | 30–98 | 40–85 |

Polyvinyl acetate, suitably in the form of an aqueous emulsion, may be mixed with the polyvinyl alcohol, as in such amount as to make the proportion of total polyvinyl alcohol about 1–50 parts and ordinarily 2–40 parts for 100 of combined weight of the acetate and alcohol.

The borate accelerator is applied either in solution, as in water, or as a dry powder to the surface of the object which is to be adhered to the surface coated with the polyvinyl alcohol. When applied wet, the accelerator solution is best dried partially or completely before adherence to the other surface is attempted. Enough borate accelerator must be applied so that the quantity remaining on and close to the surface is sufficient to accelerate the setting speed of the adhesive. When the borate accelerator is applied to paper, I find that 0.01–10 parts of the borate are applied to one surface for 1 part of polyvinyl alcohol applied to the other surface to be adhered. This provides on the surface a borate coating, either continuous or discontinuous. A satisfactory range is 0.1 to 10 grams per square foot of the sheet material to which the borate is applied. More borate is unnecessary for our purpose.

The polyvinyl alcohol adhesive solution is applied to the one surface in any convenient manner as by spraying or roller application of the solution. When the borate is also applied in solution, the borate may be applied in the same manner.

The invention will be further illustrated by description in connection with the following specific examples of the practice of it. In these examples and elsewhere herein, proportions are expressed as parts by weight unless specifically stated to the contrary.

*Example 1*

| | Parts |
|---|---|
| A. High viscosity polyvinyl alcohol (98% hydrolysis product) | 5 |
| Water | 95 |
| B. Borax "5 mol" ($Na_2B_4O_7 \cdot 5H_2O$) | 3 |
| Water | 97 |

The composition B was coated onto one of two sheets of kraft paper to be bonded and then dried. The composition A was applied to the other sheet using a No. 18 wire wound rod. The two coated surfaces joined almost immediately under a pressure of 2 p.s.i. In 15 seconds the adhesive had developed sufficient wet tack to support a load of ⅓ p.s.i. In a comparable test where no borax was used it took 75 seconds for the adhesive to develop sufficient wet tack to support ⅓ p.s.i.

*Example 2*

| | Parts |
|---|---|
| A. Polyvinyl alcohol (98% hydrolysis product) | 5 |
| Corn starch | 2 |
| Clay filler | 22 |
| Water | 71 |
| B. Borax "5 mol" ($Na_2B_4O_7 \cdot 5H_2O$) | 3 |
| Water | 97 |
| C. Sodium metaborate ($Na_2B_2O_4$) | 3 |
| Water | 97 |
| D. Boric acid ($H_3BO_3$) | 3 |
| Water | 97 |
| E. Ammonium borate ($NH_4HB_4O_7 \cdot 3H_2O$) | 3 |
| Water | 97 |

The compositions B, C, D, and E were coated on kraft paper and dried. The composition A was applied to kraft paper as in Example 1. Following are the times required to develop wet strength sufficient to support ⅓ p.s.i. when kraft paper coated with A is plied with other kraft paper.

| | Sec. |
|---|---|
| When plied to regular kraft | 26 |
| When plied to regular kraft coated with B | 10 |
| When plied to regular kraft coated with C | 6 |
| When plied to regular graft coated with D | 12 |
| When plied to regular kraft coated with E | 14 |

*Example 3*

| | Parts |
|---|---|
| Polyvinyl acetate emulsion, 55% total solids | 50 |
| Medium viscosity polyvinyl alcohol (98% hydrolysis) | 5 |
| Diethyl phthalate (plasticizer) | 2 |
| Water | 43 |

The above composition may be used to make the side seam of corrugated shipping cases. The speed of this adhesive can be increased more than 50% when the opposing flap has been coated with borax above the setting speed when no borax has been used.

*Example 4*

| | Parts |
|---|---|
| Polyvinyl acetate emulsion, 55% total solids | 74 |
| Acetyl tributyl citrate (plasticizer) | 15 |
| High viscosity polyvinyl alcohol (98% hydrolysis) | 1 |
| Water | 10 |

The above composition may be used to bond paper to various metallic foils. When the adhesive is applied to the foil and combined with paper which has been previously coated with borax, the setting speed of this adhesive will be raised up to 50% above the speed when no borax has been used.

It will be understood that it is intended to cover all changes and modifications of the examples of the invention herein chosen for the purpose of illustration which do not constitute departures from the spirit and scope of the invention.

I claim:

1. In adhering together the surfaces of two objects at least one of which is porous, the process which comprises applying to one of the surfaces a dispersion of polyvinyl alcohol in water and to the other surface a gelling agent consisting essentially of a borate of a metal selected from the group consisting of borates of the alkali metals and ammonium in amount to coat the said other surface, holding the two surfaces so treated in contact with each other until the borate causes gelation of the polyvinyl alcohol partly within the porous one of the said objects and partly between the two surfaces so that the gelation provides an adhesive bond of appreciable wet strength, and then subjecting the bonded product to drying so that water vapor escapes through the said porous one of the objects and the dry strength is developed in the adhesive, the said borate having 1–12 equivalents of the said metal for 6 atoms of boron and the proportions by weight on the dry basis being about 0.1–10 parts of the metal borate for 100 parts of the polyvinyl alcohol.

2. The process of claim 1, the said borate being sodium metaborate.

3. The process of claim 1 in which the said dispersion includes polyvinyl acetate in the proportion of about 10–80 parts for 100 of total weight of the acetate and polyvinyl alcohol.

4. The process of claim 1, in which one of the said objects is paper.

5. The process of claim 1, the amount of the borate used being about 0.1 to 10 grams per sq. ft. of the surface to which applied.

References Cited in the file of this patent

UNITED STATES PATENTS

| 2,145,195 | Bauer | Jan. 24, 1939 |
|---|---|---|
| 2,399,338 | Ford | Apr. 30, 1946 |
| 2,439,108 | Staehle | Apr. 6, 1948 |
| 2,489,145 | Lieb et al. | Nov. 22, 1949 |

FOREIGN PATENTS

| 494,929 | Great Britain | Nov. 3, 1938 |